US010887220B2

(12) United States Patent
Penno et al.

(10) Patent No.: US 10,887,220 B2
(45) Date of Patent: Jan. 5, 2021

(54) APPLICATION IDENTIFIER IN SERVICE FUNCTION CHAIN METADATA

(71) Applicant: Cisco Technology, Inc., San Jose, CA (US)

(72) Inventors: Reinaldo Penno, San Ramon, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 16/127,667

(22) Filed: Sep. 11, 2018

(65) Prior Publication Data

US 2019/0028384 A1 Jan. 24, 2019

Related U.S. Application Data

(63) Continuation of application No. 14/884,584, filed on Oct. 15, 2015, now Pat. No. 10,116,553.

(51) Int. Cl.
*H04L 12/725* (2013.01)

(52) U.S. Cl.
CPC .................. *H04L 45/306* (2013.01)

(58) Field of Classification Search
CPC .... H04L 45/306; H04L 12/5689; H04L 45/74
See application file for complete search history.

(56) References Cited

U.S. PATENT DOCUMENTS 7,864,764 B1  1/2011  Ma et al.
9,083,740 B1  7/2015  Ma et al.
10,116,553 B1 * 10/2018 Penno .................. H04L 45/306
2007/0283014 A1 12/2007 Shinomiya et al.
2008/0177896 A1  7/2008 Quinn et al.
2010/0146100 A1  6/2010 Gerber et al.
2011/0019574 A1  1/2011 Malomsoky et al.
2011/0310894 A1 12/2011 Karino
2012/0039337 A1  2/2012 Jackowski et al.
2013/0272305 A1 10/2013 Lefebvre et al.
2014/0130047 A1  5/2014 Wang et al.
2014/0237137 A1  8/2014 Ervin et al.
2014/0334488 A1 11/2014 Guichard et al.
2015/0063158 A1  3/2015 Nedeltchev et al.
2015/0103827 A1  4/2015 Quinn et al.
2015/0124815 A1  5/2015 Beliveau et al.
2015/0195197 A1  7/2015 Yong et al.

(Continued)

OTHER PUBLICATIONS

Napper, et al., "NSH Context Header Allocation—Mobility," Service Function Chaining, Internet-Draft, May 16, 2015, 6 pages; https://tools.ietf.org/html/draft-napper-sfc-nsh-mobility-allocation-01.

(Continued)

*Primary Examiner* — Steven H Nguyen

(57) ABSTRACT

This disclosure pertains to augmenting metadata of a packet destined for service function chaining with application identifier information. The application identifier information can be added to the metadata of a packet service header (or, more specifically, a network service header). The packet can be exported to a statistics collector that can correlate statistical information about the application with statistical information about service functions applied to the packet, as well as other statistical information.

20 Claims, 9 Drawing Sheets

(56) References Cited

U.S. PATENT DOCUMENTS

| | | |
|---|---|---|
| 2015/0263901 A1 | 9/2015 | Kumar |
| 2016/0099853 A1 | 4/2016 | Nedeltchev et al. |
| 2016/0127318 A1 | 5/2016 | Hua et al. |
| 2016/0134531 A1* | 5/2016 | Assarpour ............ H04L 49/309 370/392 |
| 2016/0142321 A1 | 5/2016 | Gage |
| 2016/0164776 A1 | 6/2016 | Biancaniello |
| 2016/0352629 A1* | 12/2016 | Wang ................... H04L 45/306 |
| 2017/0019341 A1 | 1/2017 | Huang et al. |
| 2017/0099194 A1* | 4/2017 | Wei ..................... H04L 41/5041 |
| 2017/0149670 A1* | 5/2017 | Backman ............... H04L 45/38 |

OTHER PUBLICATIONS

Claise, et al., "Cisco Systems Export of Application Information in IP Flow Information Export (IPFIX)," IETF, RFC 3759, ISSN: 2070-1720, Nov. 2012, 43 pages; http://www.ietf.org/rfc/rfc6759.txt.pdf.

Quinn, et al., "Problem Statement for Service Function Chaining," IETF, RFC 7498, ISSN: 2070-1721, Apr. 2015, 13 pages; https://tools.ietf.org/html/rfc7498.text.pdf.

Haeffner, et al., "Service Function Chaining Use Cases in Mobile Networks," Service Function Chaining, Internet-Draft, Jul. 19, 2015, 26 pages; https://tools.ietf.org/pdf/draft-ietf-sfc-use-case-mobility-04.pdf.

Haeffner, et al., "Service Function Chaining Use Cases in Mobile Networks," Service Function Chaining, Internet-Draft, May 5, 2014, 23 pages; https://tools.ietf.org/pdf/draft-ietf-sfc-use-case-mobility-00.pdf.

Haeffner, et al., "Service Function Chaining Use Cases in Mobile Networks," Service Function Chaining, Internet-Draft, Jan. 9, 2015, 18 pages; https://tools.ietf.org/pdf/draft-ietf-sfc-use-case-mobility-02.pdf.

Haeffner, et al., "Service Function Chaining Use Cases in Mobile Networks," Service Function Chaining, Internet-Draft, Jan. 13, 2015, 25 pages; https://tools.ietf.org/pdf/draft-ietf-sfc-use-case-mobility-03.pdf.

Haeffner, et al., "Service Function Chaining Use Cases in Mobile Networks," Service Function Chaining, Internet-Draft, Jul. 4, 2014, 23 pages; https://tools.ietf.org/pdf/draft-ietf-sfc-use-case-mobility-01.pdf.

Halpren, et al., "Service Function Chaining (SFC) Architecture," Network Working Group, Internet-Draft, Sep. 20, 2014, 26 pages; https://tools.ietf.org/pdf/draft-ietf-sfc-architecture-02.pdf.

Kumar, et al., "Service Function Chaining Use Cases in Data Centers," Service Function Chaining, Internet-Draft, Jul. 22, 2015, 23 pages; https://tools.ietf.org/pdf/draft-ietf-sfc-dc-use-cases-03.pdf.

Kumar, et al., "Service Function Chaining Use Cases in Data Centers," Service Function Chaining, Internet-Draft, Jul. 21, 2015, 23 pages; https://tools.ietf.org/pdf/draft-ietf-sfc-dc-use-cases-01.pdf.

Kumar, et al., "Service Function Chaining Use Cases in Data Centers," Service Function Chaining, Internet-Draft, May 4, 2014, 18 pages; https://tools.ietf.org/pdf/draft-ietf-sfc-dc-use-cases-00.pdf.

Kumar, et al., "Service Function Chaining Use Cases in Data Centers," Service Function Chaining, Internet-Draft, Jan. 19, 2015, 23 pages; https://tools.ietf.org/pdf/draft-ietf-sfc-dc-use-cases-02.pdf.

* cited by examiner

| Ver | O | C | R | R | R | R | R | R | Length (6) | MD Type (8) | Next Protocol (8) |
|---|---|---|---|---|---|---|---|---|---|---|---|
| Service Path Identifier (24) 406 | | | | | | | | | | | 408 Service Index (8) |
| ApplicationID 404 | | | | | | | | | | | |
| Context Headers 402 | | | | | | | | | | | |
| Original Packet Payload 410 | | | | | | | | | | | |

| Ver | O | C | R | R | R | R | R | R | Length (6) | MD Type (8) | Next Protocol (8) |
|---|---|---|---|---|---|---|---|---|---|---|---|
| Service Path Identifier (24) 456 | | | | | | | | | | | 458 Service Index (8) |
| Classification Engine ID 460 | | | | | | | | | Zero-valued Upper Bits 462 | | Selector ID 464 |
| Context Headers 452 454 | | | | | | | | | | | |
| Original Packet Payload 470 | | | | | | | | | | | |

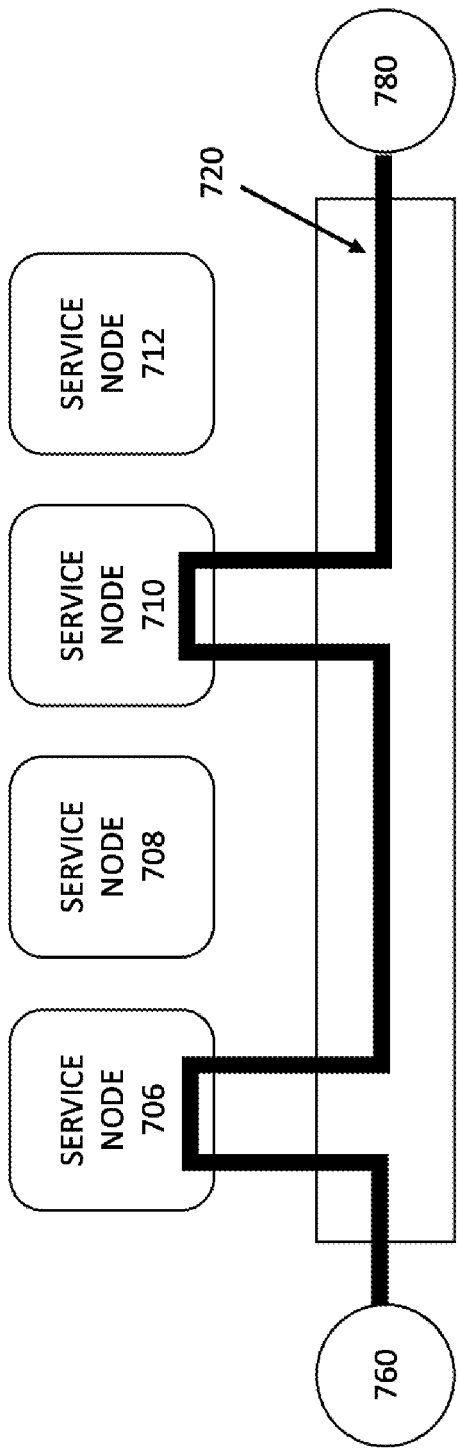
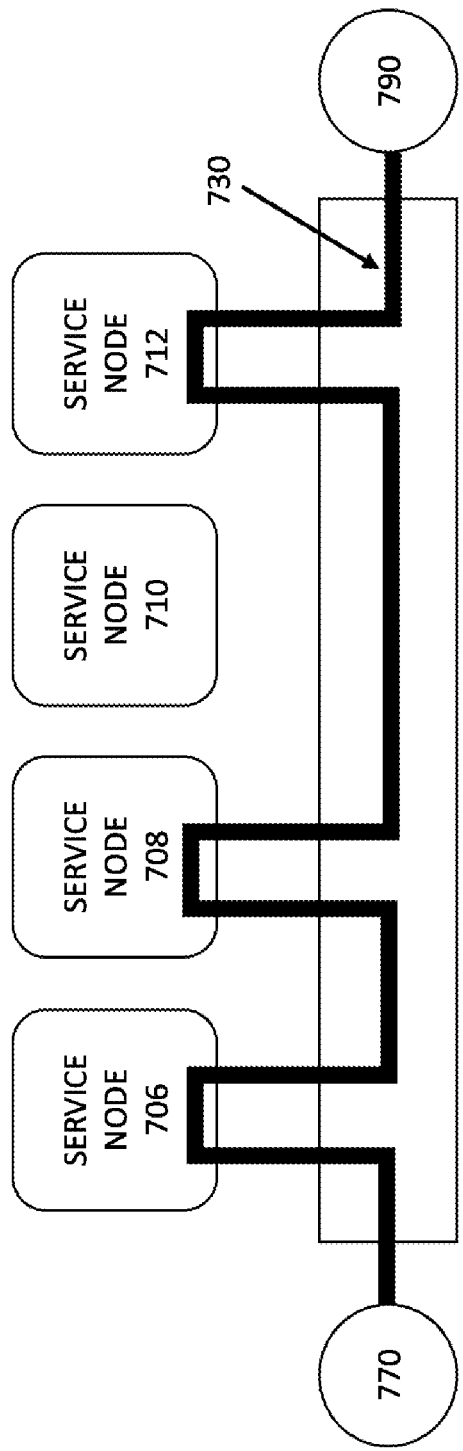
FIG. 7B
FIG. 7C

APPLICATION IDENTIFIER IN SERVICE FUNCTION CHAIN METADATA

RELATED APPLICATION

This application is a continuation of U.S. application Ser. No. 14/884,584, entitled "Application Identifier in Service Function Chain Metadata", filed Oct. 15, 2015, the entirety of which is incorporated herein by reference.

TECHNICAL FIELD

This disclosure pertains to augmenting service function chain packet metadata with application identifiers.

BACKGROUND

Service Function Chaining (SFC) facilitates the creation of composite (network) services that can include an ordered set of Service Functions (SF) that are applied to packets and/or frames and/or flows selected as a result of classification. One desired advantage of SFC is to be able to classify a packet once, and apply the resulting policy across each SF node forming the SFC. To achieve this desired result, the resulting policies from classification can be carried in packet metadata.

In Service Function Chaining (SFC), a packet may traverse different devices or nodes for the same or multiple vendors, including off-path devices, such as statistics collectors. Carrying policies in metadata may not be sufficient for every node in the SFC to understand the policies, nor guarantee interoperability across different devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 4A is a schematic block diagram of an example packet augmented with application identifier in the metadata in accordance with embodiments of the present disclosure.

FIG. 4B is a schematic block diagram of an example packet augmented with application identifier in the metadata in accordance with embodiments of the present disclosure.

FIGS. 7B-7C illustrate different service paths realized using service function chaining in accordance with embodiments of the present disclosure.

DETAILED DESCRIPTION

Figure 1:
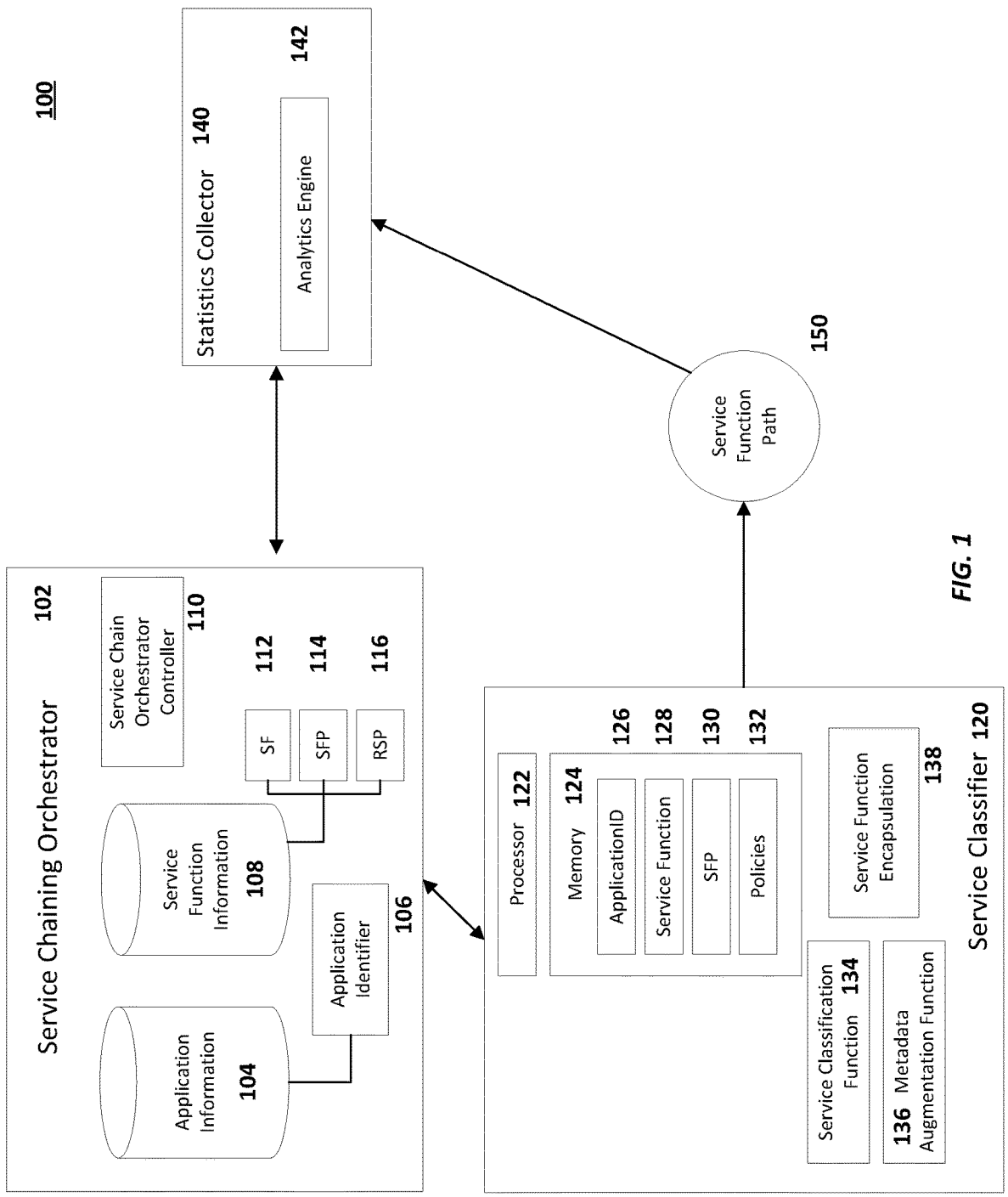
FIG. 1 is a schematic block diagram of an architecture overview for a service function chain in accordance with embodiments of the present disclosure.

This disclosure describes augmenting metadata of a packet service header with application identification information or other namespace tag structures prior to ingress into a Service Function Path (SFP). This allows structured, multi-device, multi-vendor support using information in metadata of each packet, thereby providing a normalized way of analyzing application identification across use cases. Specifically, application identification is normalized across Data Center and Mobility use cases.

This disclosure describes exporting packets or packet service headers augmented with application identification information into an analytics engine to evaluate statistics associated with the application. Statistics collection from established statistics collectors is facilitated (e.g., statistics collectors such as Netflow collectors or other collectors that use the IPFIX standard). For example, by exporting information in a standardized format, such as IPFIX, the present disclosure facilitates correlation of the classification and the metadata exported in a normalized way. Additionally, exporting packet service headers can ease correlation of data export (IPFIX) for flows before the packets enter the SFP and after exiting the SFP. The packet can change, so we retain normalized application identification.

Aspects of the embodiments include methods and computer program products for augmenting metadata of a packet service header at a service classifier node residing at an entry point of a service function chain. A packet or frame of a traffic flow may be received at a service classifier node, wherein the packet service header comprises metadata about the packet. The service classifier node may identify an application identifier for the packet. The service classifier node can augment the metadata of the packet service header with the application identifier.

In some embodiments, the packet service header comprises a network service header (NSH).

In some embodiments, the application identifier comprises a selector identifier.

In some embodiments, the application identifier comprises a classification engine identifier.

In some embodiments, the classification engine identifier comprises a value identifying a classification engine identification name and a selected identification length.

In some embodiments, identifying the application identifier comprises performing a classification function on the data packet.

In some embodiments, performing a classification function on the data packet comprises identifying a service function path for the data packet based at least in part on the identified application identifier.

Some embodiments include transmitting the packet with the application identifier into a service function path of the service function chain.

To accommodate agile networking and flexible provisioning of network nodes in the network, Service Function Chains (SFC) can be used to ensure an ordered set of Service Functions (SF) to be applied to packets and/or frames of a traffic flow. SFC provides a method for deploying SFs in a way that enables dynamic ordering and topological independence of those SFs. A service function chain can define an ordered set of service functions that is applied to packets and/or frames of a traffic flow, where the ordered set of service functions is selected as a result of classification. The implied order may not be a linear progression as the architecture allows for nodes that copy to more than one branch. The term service chain is often used as shorthand for service function chain.

FIG. 1 is a schematic block diagram of an architecture overview 100 for a service function chain in accordance with embodiments of the present disclosure. The service function chain architecture overview 100 includes a service chaining orchestrator (SCO) 102 that provides control plane and policy plane information for nodes in the service function chain. The SCO may include a service chain orchestration controller 110 and can include datastores that include information for facilitating the service function chaining. For example, the SCO 102 can include application information 104 that includes information about the applications that data packets may represent. Application information 104 includes application identifiers 106 pointing to applications and application information structures.

In some embodiments, the application information structures can include structures as shown in Table 1:

TABLE 1

| Application Identification Data Format (Information Element) |
| --- |
| 0 1 2 3 4 5 6 7   8 9 0 1 2 3 4 5 6 7 8 9 0 1 2 3 4 5 6 7 8 9 0 1 |
| Class. Eng. ID.   Zero-valued upper bits . . . Selector ID |

The application identifiers can include a data format (or information element) that identifies a classification engine identifier (value) and corresponding selector identifier. In some embodiments, the application identification data format can coincide with information and formatting consistent with Internet Engineering Task Force (IETF) RFC6759, "Cisco Systems Export of Application Information in IP Flow Information Export (IPFIX)." The application identification data format can then be used by IPFIX or NetFlow or other analytics engines to collect statistics about service functions associated with the application (and vice versa—collect application information for each service function), as well as correlate data collected between service functions and applications as well as other information.

The classification engine identifier can be a classification engine identifier value that corresponds to a classification engine identifier name and a corresponding selector identifier default length. Table 2 shows example classification engine identifier value with corresponding classification engine identifier name and selector identifier:

TABLE 2

| Classification Engine Identifier Information ||| 
| --- | --- | --- |
| Classification Engine ID Value | Classification Engine ID Name | Selector ID Default Length (in octets) |
| 1 | IANA-L3 | 1 |
| 2 | PANA-L3 | 1 |
| 3 | IANA-L4 | 2 |
| 4 | PANA-L4 | 2 |
| 6 | USER-Defined | 3 |
| 12 | PANA-L2 | 5 |
| 13 | PANA-L7 | 3 |
| 18 | ETHERTYPE | 2 |
| 19 | LLC | 1 |
| 20 | PANA-L7-PEN | 3 |

IANA is Internet Assigned Numbers Authority, which controls numbers for protocols. PANA is Proprietary Assigned Number Authority, which supports enterprise specific version of IANA for internal IDs.

The service chain orchestrator 102 can also include Service Function Information 108. Service Function Information 108 can include information such as service functions (SF) 112, service function paths (SFP) 114, and rendered service paths (RSP) 116. A Service Function (SF) 112 is described in IETF Service Function Chaining (SFC) Architecture (draft-ietf-sfc-architecture-11). A SF 112 is responsible for specific treatment of received packets. A SF 112 can act at various layers of a protocol stack (e.g., at the network layer or other OSI layers). As a logical component, a SF 112 can be realized as a virtual element or be embedded in a physical network element. One or more SFs 112 can be embedded in the same network element. Multiple occurrences of the SF 112 can exist in the same administrative domain.

One or more SFs 112 can be involved in the delivery of added-value services. A non-exhaustive list of abstract SFs includes: firewalls, WAN and application acceleration, Deep Packet Inspection (DPI), LI (Lawful Intercept), server load balancing, NAT44, NAT64, NPTv6, HOST_ID injection, HTTP Header Enrichment functions, TCP optimizer, etc. An SF may be SFC encapsulation aware, that is it receives and acts on information in the SFC encapsulation, or unaware, in which case data forwarded to the SF does not contain the SFC encapsulation.

The Service Function Path (SFP) 114 provides a level of indirection between the fully abstract notion of service chain as a sequence of abstract service functions to be delivered, and the fully specified notion of exactly which Service Function Forwarder/Service Function (SFF/SFs) the packet will visit when it actually traverses the network. By allowing the control components to specify this level of indirection, the operator may control the degree of SFF/SF selection authority that is delegated to the network.

The SCO also includes rendered service paths (RSP) 116. The Service Function Path is a constrained specification of where packets using a certain service chain must go. While it may be so constrained as to identify the exact locations, it can also be less specific.

Packets themselves are transmitted to and from specific places in the network, visiting a specific sequence of SFFs and SFs. This sequence of actual visits by a packet to specific SFFs and SFs in the network is known as the Rendered Service Path (RSP) 116.

The service chain orchestrator controller 110 can use application information 104 and service function information 108 to interface with the service classifier 120. The service chain orchestrator controller 110 can provide the information the service classifier 120 needs to classify the packets entering the service function chain.

The service classifier 120 resides at entry points into a SFP. The service classifier 120 may include a processor 122 and a memory 124. Processor 122 may be a hardware or software processor or combination of hardware and software. The processor 122 can execute instructions stored in memory 124 to classify data packets for service function chaining and for augmenting metadata in data packets with application identification information (such as application identifiers).

Memory 124 can include service function information 128 and service function path information 130 and policies 132, each of which can be used by the processor 122 individually or in combination for executing a service classification function for classifying data packets prior to entering a service function chain.

The service classification function 134 can process a packet of a traffic flow and determine that the packet requires servicing and correspondingly which service path to follow to apply the appropriate service. The determination can be performed based on business policies (e.g., policies 132) and/or other rules stored in memory 124. Once the determination of the service path is made by the processor 122 using service function information 128 and policies 132 and other rules, service header encapsulator 138 generates an appropriate packet service header having identification information for the service path and adds the packet service header to the packet. The service header encapsulator 138 can also use application identification information 126 and add application identifiers to the packet service header. In some embodiments, the metadata augmentation function 136 can use information from Service Chaining Orchestrator (SCO) 102 to identify application identification information for the packet and add the application identifiers 126 to the packet service header.

In some embodiments, the packet service header comprises a network services header (NSH). The service header encapsulator 138 provides an outer encapsulation to forward the packet to the start of the service function path 150. Other SFC-aware network elements are thus able to process the NSH while other non-SFC-aware network elements would simply forward the encapsulated packets as is.

Traffic (i.e., data packets) that satisfies classification rules is forwarded according to a specific SFP. For example, classification can include an explicit forwarding entry that forwards all traffic from one address into the SFP.

Multiple classification points are possible within an SFC thus enabling changes/updates to the SFC by SFs. Classification can occur at varying degrees of granularity; for example, classification can use a 5-tuple, a transport port or set of ports, part of the packet payload, or it can come from external systems.

Traffic from the network that satisfies classification criteria is directed into an SFP and forwarded to the requisite service function(s). Classification is handled by a service classification function; initial classification occurs at the ingress to the SFC domain. The granularity of the initial classification is determined by the capabilities of the classifier and the requirements of the SFC policy. For instance, classification might be relatively coarse: all packets from this port are subject to SFC policy X and directed into SFP A, or quite granular: all packets matching this 5-tuple are subject to SFC policy Y and directed into SFP B.

As a consequence of the classification decision, the appropriate SFC encapsulation is imposed on the data, and a suitable SFP is selected or created. Classification results in attaching the traffic to a specific SFP 150.

System 100 also includes a statistics collector 140 that can receive statistical information from the service function path 150. Specifically, statistics collector 140 can include an analytics engine 142. The statistics collector 140 can collect statistics information from the service function path 150 (or, put differently, the application identification information and statistical information can be exported to the statistics collector). The analytics engine 142 can use statistical information from the service function path to correlate the application identification information with the statistics collected by the statistics collector 140.

Statistics collector 140 can communicate with the SCO 102 to receive application identification information to decode the application identifiers in the packet service header.

Figure 2:
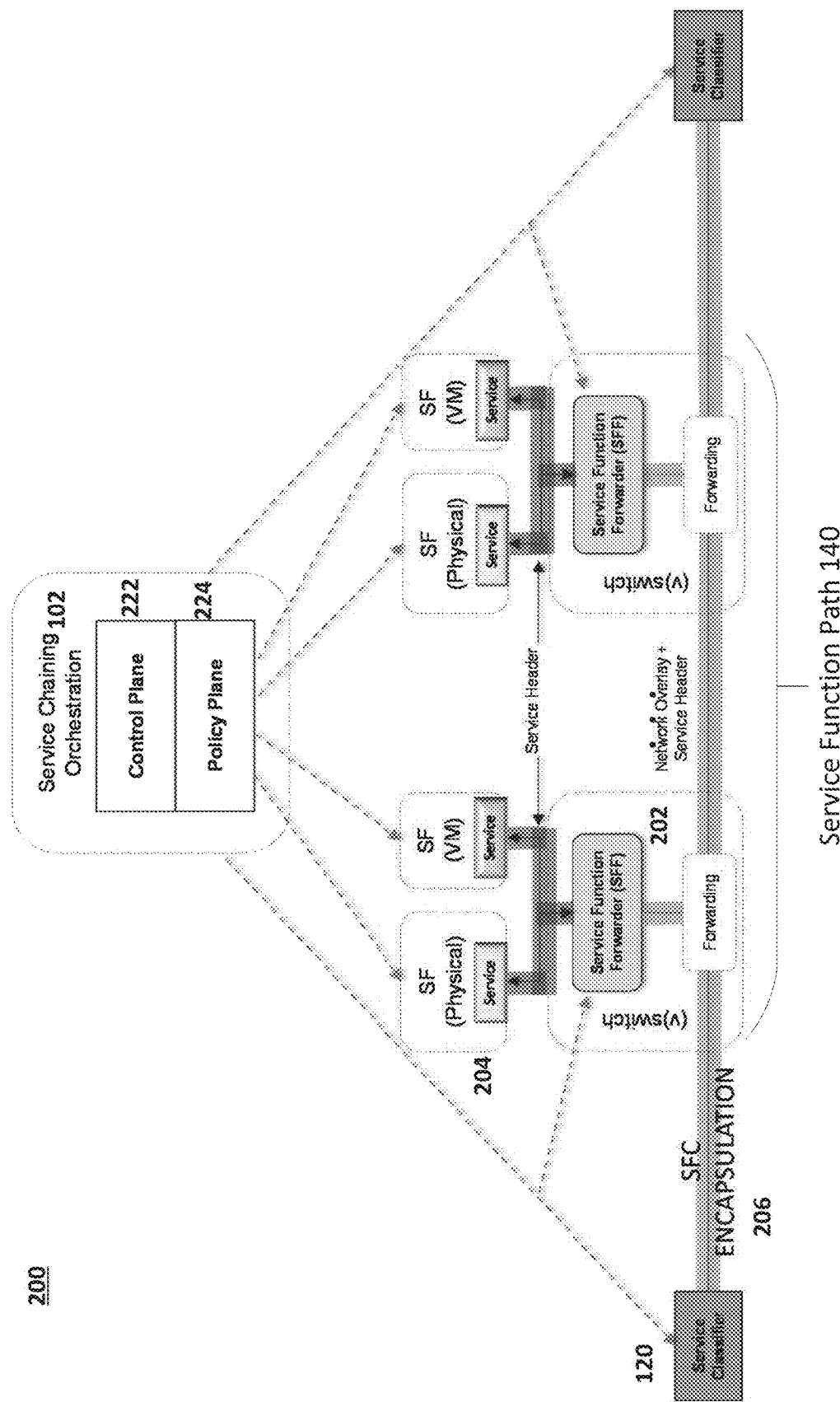
FIG. 2 is a schematic block diagram of an example service function chain in accordance with embodiments of the present disclosure

FIG. 2 is a schematic block diagram of an example service function chain (SFC) 200 in accordance with embodiments of the present disclosure. A service function chain 200 defines a set of abstract service functions 204 and ordering constraints that must be applied to packets and/or frames selected as a result of classification. The implied order may not be a linear progression as the architecture allows for SFCs 200 that copy to more than one branch, and also allows for cases where there is flexibility in the order in which service functions need to be applied.

The service function chain 200 may include a service function path 140. A service function path (SFP) 150 is a mechanism used by service chaining to express the result of applying more granular policy and operational constraints to the abstract requirements of a service chain. This architecture does not mandate the degree of specificity of the SFP 140. Architecturally, within the same SFC-enabled domain, some SFPs 140 may be fully specified, selecting exactly which service function forwarder (SFF) 202 and which SF are to be visited by packets using that SFP 140, while other SFPs may be quite vague, deferring to the SFF 202 the decisions about the exact sequence of steps to be used to realize the SFC 200. The specificity may be anywhere in between these extremes.

A service function forwarder 202 is responsible for delivering traffic received from the network to one or more connected service functions according to information carried in the SFC encapsulation 206, as well as handling traffic coming back from the SF. Additionally, a service function forwarder is responsible for delivering traffic to a classifier when needed and supported, mapping out traffic to another SFF (in the same or different type of overlay), and terminating the SFP 140.

The SFC Encapsulation 206 provides at a minimum SFP identification, and is used by the SFC-aware functions, such as the SFF 202 and SFC-aware SFs. The SFC Encapsulation 206 is not used for network packet forwarding. In addition to SFP identification, the SFC encapsulation 206 carries data plane context information, also referred to as metadata.

As mentioned above, the service classifier 120 can add application identifiers to the packet service header metadata. The packet then traverses the service function chain 200. The packet is forwarded via a SFF 202 based on service function information and policies identified as part of the classification. The SFF 202 delivers the packet to the SF 204. The SFF 202 can then forward the packet to the next SFF 202 and SF 204.

As an example of such an intermediate specificity, there may be two SFPs associated with a given SFC, where one SFP says essentially that any order of SFF and SF may be used as long as it is within data center, and where the second SFP allows the same latitude, but only within data center 2.

Thus, the policies and logic of SFP selection or creation (depending upon the solution) produce what may be thought of as a constrained version of the original SFC. Since multiple policies may apply to different traffic that uses the same SFC, it also follows that there may be multiple SFPs may be associated with a single SFC.

The architecture allows for the same SF to be reachable through multiple SFFs. In these cases, some SFPs may constrain which SFF is used to reach which SF, while some SFPs may leave that decision to the SFF itself.

Further, the architecture allows for two or more SFs to be attached to the same SFF, and possibly connected via internal means allowing more effective communication. In these cases, some solutions or deployments may choose to use some form of internal inter-process or inter-VM messaging (communication behind the virtual switching element) that is optimized for such an environment. This must be coordinated with the SFF so that the service function forwarding can properly perform its job. Implementation details of such mechanisms are considered out of scope for this document, and can include a spectrum of methods: for example situations including all next-hops explicitly, others where a list of possible next-hops is provided and the selection is local, or cases with just an identifier, where all resolution is local.

This architecture also allows the same SF to be part of multiple SFPs. The SFC Encapsulation provides at a minimum SFP identification, and is used by the SFC-aware functions, such as the SFF and SFC-aware SFs. The SFC Encapsulation is not used for network packet forwarding. In addition to SFP identification, the SFC encapsulation carries data plane context information, also referred to as metadata.

In most networks, services are constructed as abstract sequences of SFs that represent SFCs. At a high level, an SFC is an abstracted view of a service that specifies the set of required SFs as well as the order in which they must be executed. Graphs, as illustrated in FIG. 1, define an SFC, where each graph node represents the required existence of at least one abstract SF. Such graph nodes (SFs) can be part of zero, one, or many SFCs. A given graph node (SF) can appear one time or multiple times in a given SFC.

SFCs can start from the origination point of the service function graph (i.e.: node 1 in FIG. 1), or from any subsequent node in the graph. SFs may therefore become branching nodes in the graph, with those SFs selecting edges that move traffic to one or more branches.

An SFC can have more than one terminus.

Service chaining orchestrator 102 includes a control plane and a policy plane. The SFC control plane is responsible for constructing SFPs, translating SFCs to forwarding paths and propagating path information to participating nodes to achieve requisite forwarding behavior to construct the service overlay. For instance, an SFC construction may be static; selecting exactly which SFFs and which SFs from those SFFs are to be used, or it may be dynamic, allowing the network to perform some or all of the choices of SFF or SF to use to deliver the selected service chain within the constraints represented by the service path.

In the SFC architecture, SFs are resources; the control plane 222 manages and communicates their capabilities, availability and location in fashions suitable for the transport and SFC operations in use. The control plane 222 is also responsible for the creation of the context (see below). The control plane 222 may be distributed (using new or existing control plane protocols), or be centralized, or a combination of the two.

The SFC control plane 222 provides the following functionality:

1. An SFC-enabled domain wide view of all available service function resources as well as the network locators through which they are reachable.
2. Uses SFC policy to construct service function chains, and associated service function paths.

The SFC policy plane 224 maintains policy information about the SFCs. Control plane 222 and policy plane 224 instantiate service chains adhering to a certain policy.

Figure 3:
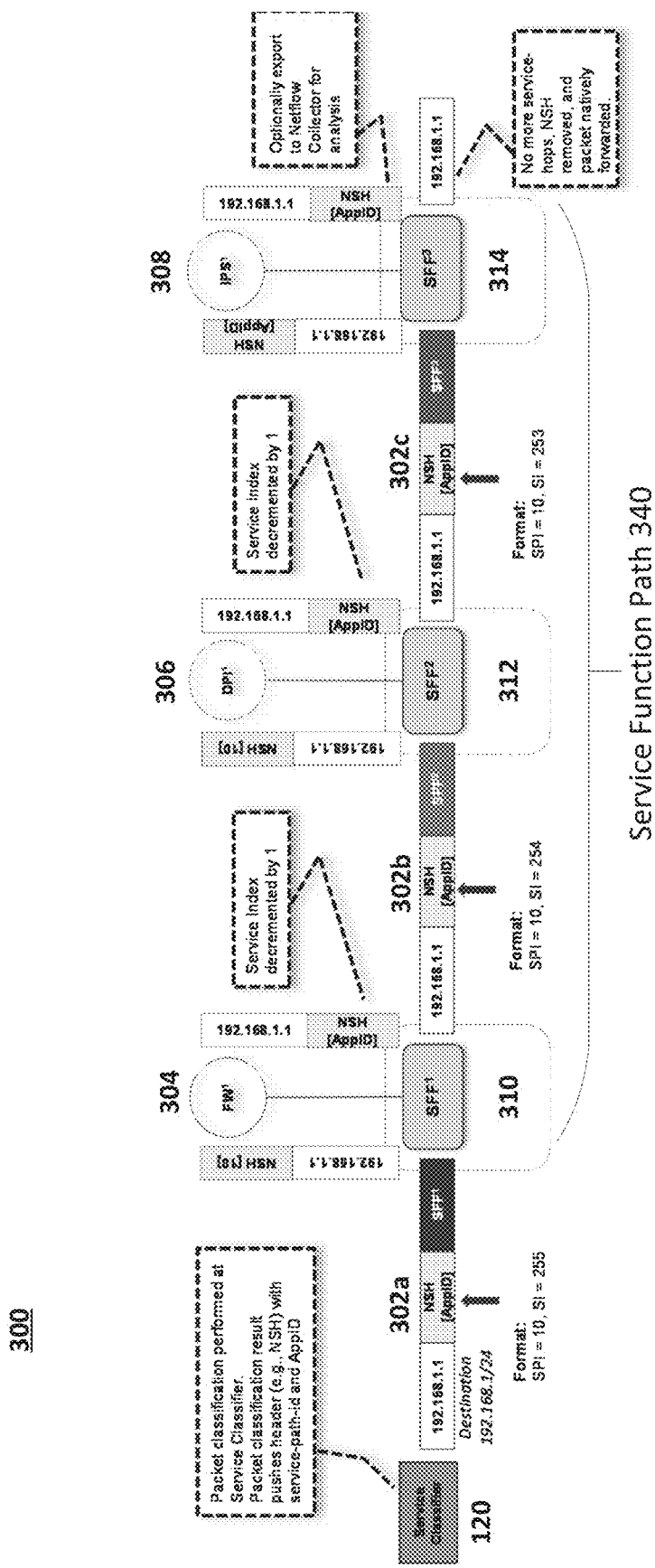
FIG. 3 is a schematic block diagram of an example packet traversing an example service function chain in accordance with embodiments of the present disclosure.

FIG. 3 is a schematic block diagram of an example packet traversing an example service function chain 300 in accordance with embodiments of the present disclosure. The service classifier 120 can execute a service classification function on a data packet and can add an application identifier to the metadata of the data packet prior to delivering the data packet to the service function chain 300.

FIG. 3 shows a more detailed flow of a data packet traversing the service function chain 300. At the outset, the data packet 302a includes a destination address, a packet service header (e.g., a network service header (NSH)) that includes the application identifier, a service path identifier (SPI) and a service index (SI), and a SFF identifier that points to an SFF. The SPI is used to identify the service path that interconnects the needed service functions. It provides a level of abstraction allowing nodes to utilize the identifier to select the appropriate network transport protocol and forwarding techniques. The service index (SI) identifies the location of a packet within a service path. As packets traverse a service path, the SI is decremented post-service. Additionally, the combination of SPI and SI provides operators with clear visibility into where packets are in relation to the service functions on a service path.

For example, data packet 302a includes a packet service header that includes metadata augmented with the application identifier for the application associated with the data packet 302a. The packet service header of the data packet 302a also includes an SPI=10, which identifies the service function path 340. The service function path 340 includes service functions: Firewall (FW) 304, Deep Packet Inspection (DPI) 306, and Intrusion Protection System (IPS) 308, and perhaps others not shown. For service function path 340, the initial SI, for SF Firewall 304, is set to 255. The data packet 302a is delivered by SFF1 310 to SF FW 304 and the data packet undergoes the service for Firewall 304. After the data packet undergoes the FW 304 service, SI is decremented to 254. The data packet 302b, therefor, includes the application identifier, SPI=10, and SI=254, and SFF2, which points to the next SF DPI 306.

The data packet 302b is then delivered by the SFF2 312 for deep packet inspection service 306. The SI is then decremented to 253. The data packet 302c is then delivered to SF IPS 308 by SFF3 314.

After the data packet is delivered to the last SF (i.e., there are no further service hops), the packet service header can be removed, and the packet natively forwarded to its destination. In some embodiments, the packet with the packet service header can be exported to a statistics collector for analysis. For example, the statistics collector can be a Netflow connector or collector compatible with IPFIX or other collector that can use the application identifier included in the metadata of the packet service header.

FIG. 4A is a schematic block diagram of an example packet 400 augmented with application identifier in the metadata in accordance with embodiments of the present disclosure. The packet 400 includes context headers 402, as well as a service path identifier (SPI) 406 and service index (SI) 408. The packet 400 also includes a payload 410. The context headers can be augmented with application identifier 404.

FIG. 4B is a schematic block diagram of an example packet 450 augmented with application identifier in the metadata in accordance with embodiments of the present disclosure. The packet 450 includes context headers 452, as well as a service path identifier (SPI) 456 and service index (SI) 458. The packet 450 also includes a payload 470. The context headers can be augmented with application identifier 454. In this example embodiment, the application identifier 454 comprises classification engine identifier 460 and selector identifier 464, as well as other bit fields, such as zero-valued upper bits 462. The application identifier 454 can be consistent with Table 1 above.

Figure 5:
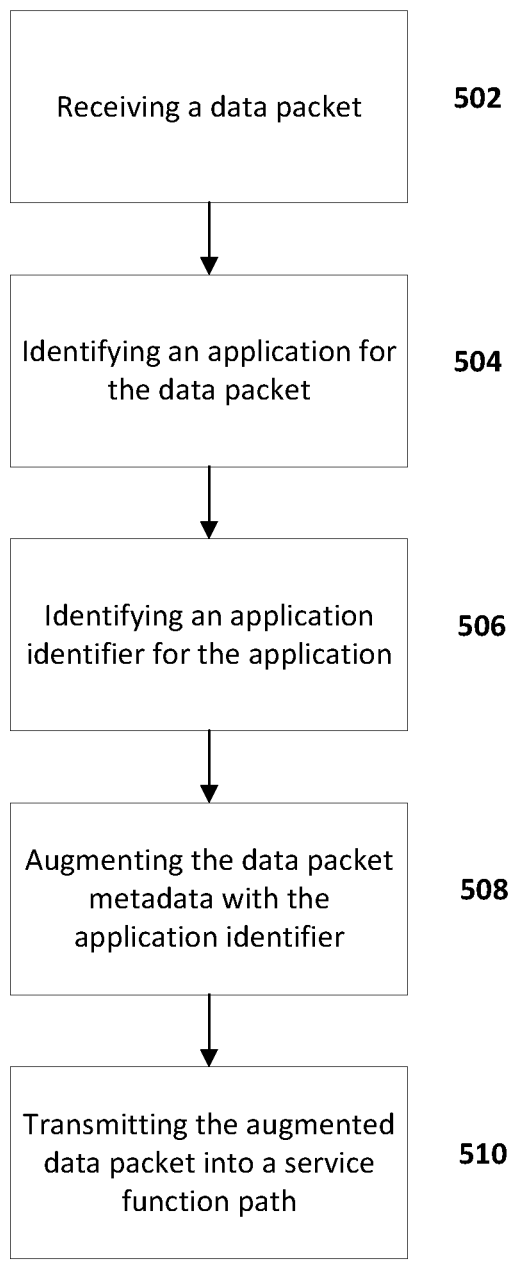
FIG. 5 is a process flow diagram for augmenting a packet with application identifier information in accordance with embodiments of the present disclosure.

FIG. 5 is a process flow diagram 500 for augmenting a packet with application identifier information in accordance with embodiments of the present disclosure. The service classifier can receive a data packet prior to a service function chaining entry point (502). The service classifier can perform classification of the data packet, which can include identifying an application associated with the data packet (504). The service classifier can also identify an application identifier for the application associated with the data packet (506). The service classifier can augment the metadata of the packet service header with the application identifier (508). In some implementations, the service classifier can augment the metadata with the application identifier by adding a classification engine ID to the metadata and, in some cases, can also add a selector ID to the metadata. The service classifier can forward the packet with the application identifier in the packet service header into the service function chain (510).

Figure 6:
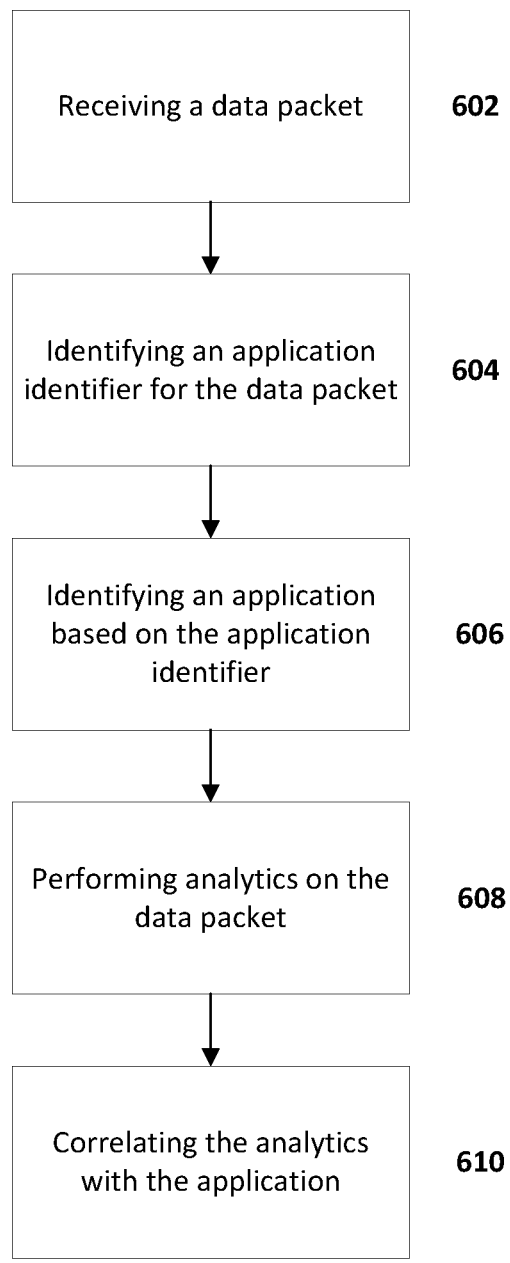
FIG. 6 is a process flow diagram for using application identifier information to collect information about the service function chain in accordance with embodiments of the present disclosure.

FIG. 6 is a process flow diagram 600 for using application identifier information to collect information about the service function chain in accordance with embodiments of the present disclosure. A statistics collector can receive a data packet (602). For example, a data packet carrying an application identifier may be exported to a statistics collector, such as a Netflow collector. The statistics collector can identify an application identifier from the metadata of the packet service header (604). The statistics collector can identify an application associated with the data packet based on the application identifier (606). For example, the statistics collector can communicate with the service chaining orchestrator to decode the application identifier in the data packet metadata. The statistics collector can perform analytics on the data packet (608). For example, the statistics collector can use an analytics engine to perform analytics on the data packet, such as statistics about the service functions performed on the data packet and statistics for the application associated with the application identifier. The statistics collector can also correlate the analytics and statistics with the application identified by the application identifier (610).

To accommodate agile networking and flexible provisioning of network nodes in the network, Service Function Chains (SFC) can be used to ensure an ordered set of Service Functions (SF) to be applied to packets and/or frames of a traffic flow. SFCs provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification. The implied order may not be a linear progression as the architecture allows for nodes that copy to more than one branch. The term service chain is often used as shorthand for service function chain.

Figure 7A:
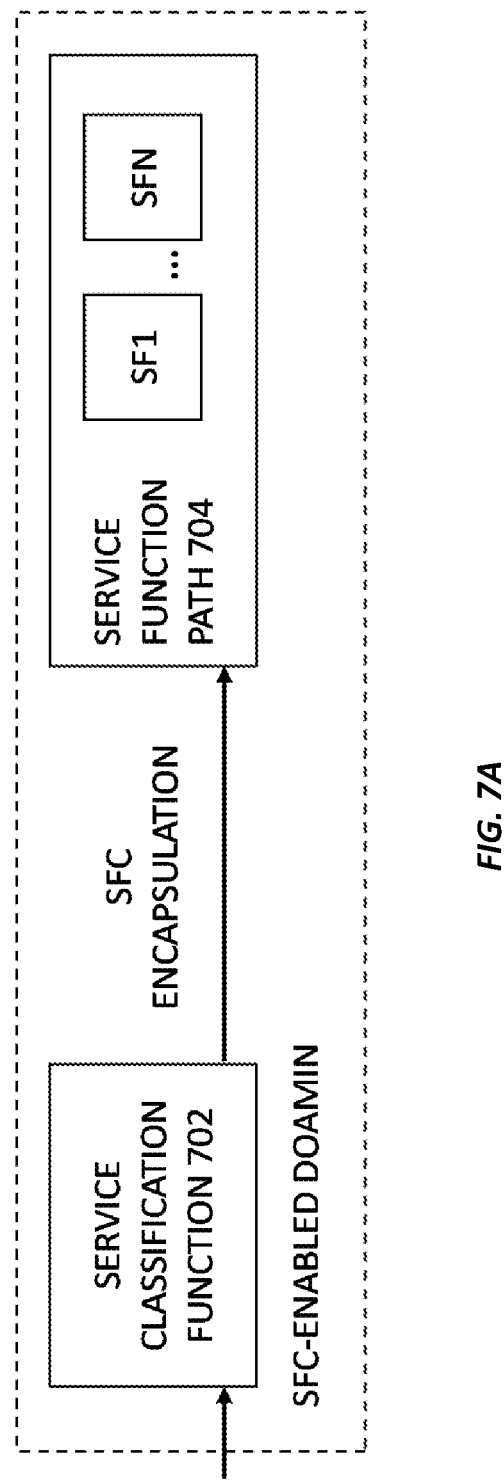
FIG. 7A is a schematic block diagram of a Service Function Chain (SFC) in accordance with embodiments of the present disclosure.

FIG. 7A illustrates a Service Function Chain (SFC), which may include an initial service classification function 702, as an entry point into a Service Function Path (SFP) 704 (or service path). The (initial) service classification function 702 prescribes a service path, and encapsulates a packet or frame with the service path information which identifies the service path. The classification potentially adds metadata, or shared context, to the SFC encapsulation part of the packet or frame. The service function path 704 may include a plurality of service functions (shown as "SF1", ... "SFN").

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by the at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers, NAT44, NAT64, HOST_ID injection, HTTP Header Enrichment functions, TCP optimizer, etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a classifier through the requisite service functions.

FIG. 7B-7C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 7B, a service path 720 can be provided between end point 760 and endpoint 780 through service node 706 and service node 710. In the example shown in FIG. 7C, a service path 730 (a different instantiation) can be provided between end point 770 and endpoint 790 through service node 706, service node 708, and service node 712.

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 8:
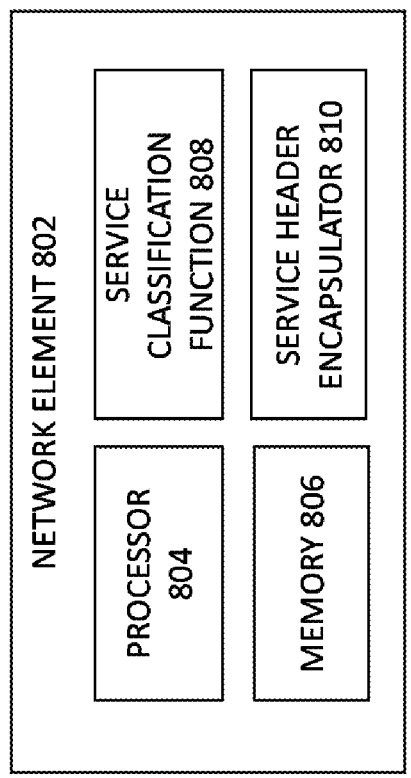
FIG. 8 is a schematic block diagram of a SFC-aware network element according to embodiments of this disclosure.

FIG. 8 shows a system view of SFC-aware network element, e.g., such as a (initial) service classifier (SCL), for prescribing a service path of a traffic flow, according to some embodiments of the disclosure. Network element 802 includes processor 804, (computer-readable non-transitory) memory 806 for storing data and instructions. Furthermore, network element 802 includes service classification function 808 and service header encapsulator 210 (both can be provided by processor 804 when processor 804 executes the instructions stored in memory 806).

The service classification function 808 can process a packet of a traffic flow and determine whether the packet requires servicing and correspondingly which service path to follow to apply the appropriate service. The determination can be performed based on business policies and/or rules stored in memory 806. Once the determination of the service path is made, service header encapsulator 210 generates an appropriate NSH having identification information for the service path and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 802 can also remove the NSH if the service classification function 808 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Service Nodes and Proxy Nodes

Figure 9:
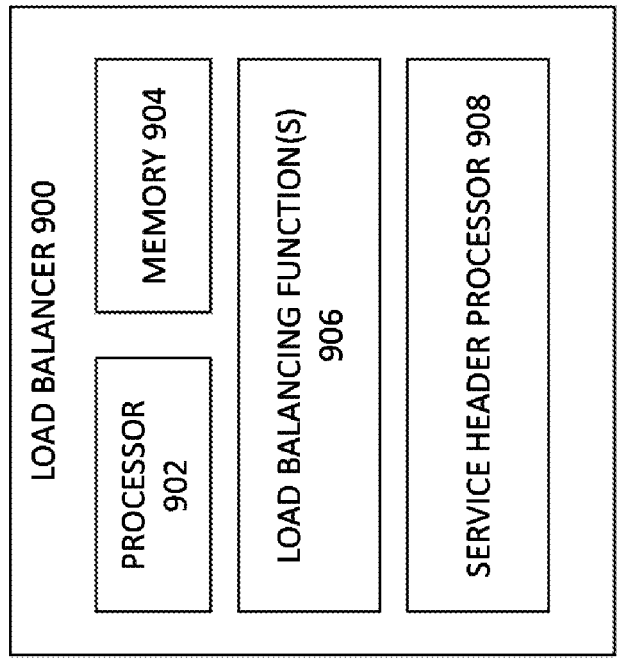
FIG. 9 is a schematic block diagram of a service node according to embodiments of this disclosure.

Once properly encapsulated, the packet having the NSF is then forwarded to one or more service nodes where service(s) can be applied to the packet/frame. FIG. 9 shows a system view of a service node, according to some embodiments of the disclosure. Service node 900, generally a network element, can include processor 902, (computer-readable non-transitory) memory 904 for storing data and instructions. Furthermore, service node 900 includes service function(s) 906 (e.g., for applying service(s) to the packet/frame, classifying the packet/frame) and service header processor 908. The service functions(s) 906 and service header processor 906 can be provided by processor 902 when processor 902 executes the instructions stored in memory 904. Service header processor 908 can extract the NSH, and in some cases, update the NSH as needed. For instance, the service header processor 908 can decrement the service index if a service index=0 is used to indicate that a packet is to be dropped by the service node 900. In another instance, the service header processor 908 or some other suitable module provide by the service node can update context header fields if new/updated context is available.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for augmenting metadata of a packet service header at a service classifier network element of a service function chain, the method comprising:
   obtaining, from a service chain orchestration controller, application information comprising information about applications that data packets may represent and application information structures used for structuring the application information;
   receiving a packet of a traffic flow, the packet comprising the packet service header, wherein the packet service header comprises the metadata about the packet;
   augmenting the metadata of the packet service header with an application identifier for the packet, the application identifier obtained from the application information and including a classification engine identifier;
   performing a classification function on the packet by identifying a selected service function path for the packet based at least in part on the application identifier;

transmitting the packet with the application identifier into the selected service function path of the service function chain; and exporting the metadata of the packet service header of the packet.

2. The method of claim 1, wherein the classification function is based on at least one policy stored at the service classifier network element.

3. The method of claim 1, further comprising:
receiving the packet at a last service function in the selected service function path of the service function chain; and
removing the packet service header of the packet.

4. The method of claim 1, wherein the application identifier is used to collect information about the service function chain by correlating the application identifier with at least one service function of the service function chain.

5. The method of claim 1, wherein the packet service header comprises a network service header that includes a service path identifier that identifies the service function chain and is different from the application identifier.

6. The method of claim 1, further comprising:
receiving the packet at a service node in the selected service function path of the service function chain;
extracting a network service header from the packet service header of the packet by a service header processor of the service node; and
updating the network service header of the packet by the service header processor.

7. The method of claim 1, wherein the application identifier further includes a selector identifier for correlating the application identifier with analytics produced for the traffic flow.

8. The method of claim 1, wherein exporting the metadata of the packet service header of the packet includes:
exporting, to an analytics engine, the metadata of the packet service header of the packet that is augmented with the application identifier, to perform analytics on the packet based on the application identifier correlated with at least one service function of the service function chain.

9. One or more non-transitory computer readable storage media encoded with software comprising computer executable instructions and when the software is executed operable to:
obtain, from a service chain orchestration controller, application information comprising information about applications that data packets may represent and application information structures used for structuring the application information;
receive a packet of a traffic flow, the packet comprising a packet service header, wherein the packet service header comprises metadata about the packet;
augment the metadata of the packet service header with an application identifier for the packet, the application identifier obtained from the application information and including a classification engine identifier;
perform a classification function on the packet by identifying a selected service function path for the packet based at least in part on the application identifier;
transmit the packet with the application identifier into the selected service function path of a service function chain; and
export the metadata of the packet service header of the packet.

10. The one or more computer readable storage media of claim 9, wherein the classification function is based on at least one policy stored at a service classifier network element.

11. The one or more computer readable storage media of claim 9, further operable to:
receive the packet at a last service function in the selected service function path of the service function chain; and
remove the packet service header of the packet.

12. The one or more computer readable storage media of claim 9, wherein the application identifier is used to collect information about the service function chain.

13. The one or more computer readable storage media of claim 9, wherein the packet service header comprises a network service header.

14. The one or more computer readable storage media of claim 13, further operable to:
receive the packet at a service node in the selected service function path of the service function chain;
extract the network service header of the packet by a service header processor of the service node; and
update the network service header of the packet by the service header processor.

15. The one or more computer readable storage media of claim 9, further operable to perform analytics on the packet to determine statistics related to one or more service functions performed on the packet in the service function chain.

16. An apparatus for augmenting metadata of a packet service header, comprising:
at least one memory element having instruction stored thereon;
at least one processor coupled to the at least one memory element and configured to execute the instructions to cause the apparatus to:
obtain, from a service chain orchestration controller, application information comprising information about applications that data packets may represent and application information structures used for structuring the application information;
receive a packet of a traffic flow, the packet comprising the packet service header, wherein the packet service header comprises the metadata about the packet;
augment the metadata of the packet service header with an application identifier for the packet, the application identifier obtained from the application information and including a classification engine identifier;
perform a classification function on the packet by identifying a selected service function path for the packet based at least in part on the application identifier;
transmit the packet with the application identifier into the selected service function path of a service function chain; and
export the metadata of the packet service header of the packet.

17. The apparatus of claim 16, wherein the classification function is based on at least one policy stored at a service classifier network element.

18. The apparatus of claim 16, wherein the instructions further cause the apparatus to:
receive the packet at a last service function in the selected service function path of the service function chain; and
remove the packet service header of the packet.

19. The apparatus of claim 16, further comprising a service header processor configured to:
   extract a network service header from the packet service header of the packet; and
   update the network service header of the packet.

20. The apparatus of claim 16, wherein the instructions further cause the apparatus to perform analytics on the packet to determine statistics related to one or more service functions performed on the packet in the service function chain.

* * * * *